(12) United States Patent
Williams et al.

(10) Patent No.: US 10,227,469 B1
(45) Date of Patent: Mar. 12, 2019

(54) POLYAMIDE AEROGELS

(71) Applicant: The United States of America, as represented by the Administrator of the National Aeronautics and Space Administration, Washington, DC (US)

(72) Inventors: Jarrod C. Williams, Lakewood, OH (US); Mary Ann B. Meador, Strongsville, OH (US)

(73) Assignee: The United States of America as Represented by the Administrator of National Aeronautics and Space Administration, Washington, DC (US)

( * ) Notice: Subject to any disclaimer, the term of this patent is extended or adjusted under 35 U.S.C. 154(b) by 160 days.

(21) Appl. No.: 15/238,856

(22) Filed: Aug. 17, 2016

Related U.S. Application Data

(60) Provisional application No. 62/214,375, filed on Sep. 4, 2015.

(51) Int. Cl.
| | | |
|---|---|---|
| *C08J 9/00* | (2006.01) | |
| *C08J 9/28* | (2006.01) | |
| *C08G 101/00* | (2006.01) | |

(52) U.S. Cl.
CPC ............ *C08J 9/286* (2013.01); *C08J 9/0066* (2013.01); *C08G 2101/0091* (2013.01); *C08J 9/28* (2013.01); *C08J 2201/0502* (2013.01); *C08J 2205/026* (2013.01); *C08J 2377/00* (2013.01); *C08J 2377/10* (2013.01)

(58) Field of Classification Search
CPC .. C08G 2101/0091; C08J 9/28; C08J 2377/00
See application file for complete search history.

(56) References Cited

U.S. PATENT DOCUMENTS

| 7,780,890 B2 | 8/2010 | Lee et al. |
| 9,206,298 B2 | 12/2015 | Rodman et al. |
| 2006/0074151 A1 | 4/2006 | He et al. |
| 2006/0261304 A1 | 11/2006 | Muthukumaran et al. |
| 2014/0287641 A1 | 9/2014 | Steiner, III |
| 2018/0112054 A1* | 4/2018 | Steiner, III ............... C08J 9/28 |

OTHER PUBLICATIONS

Tokars, Jr., Roger P., Lekki, John D.; title "Self Diagnostic Accelerometer testing on the C-17 aircraft"; IEEE Aerospace Conference, Big Sky, Montana; Mar. 2-9, 2013.

Tokars, Jr., Roger P., Lekki, John D.; title Self Diagnostic Accelerometer Ground Testing on a C-17 Aircraft Engine; IEEE Aerospace Conference, Big Sky, Montana; Mar. 2-9, 2013.

* cited by examiner

*Primary Examiner* — Melissa A Rioja
(74) *Attorney, Agent, or Firm* — Robert H. Earp, III; William M. Johnson

(57) ABSTRACT

A polyamide aerogel and method of making the same is disclosed. The aerogel includes para-substituted monomers without a cross-linking agent.

12 Claims, 17 Drawing Sheets

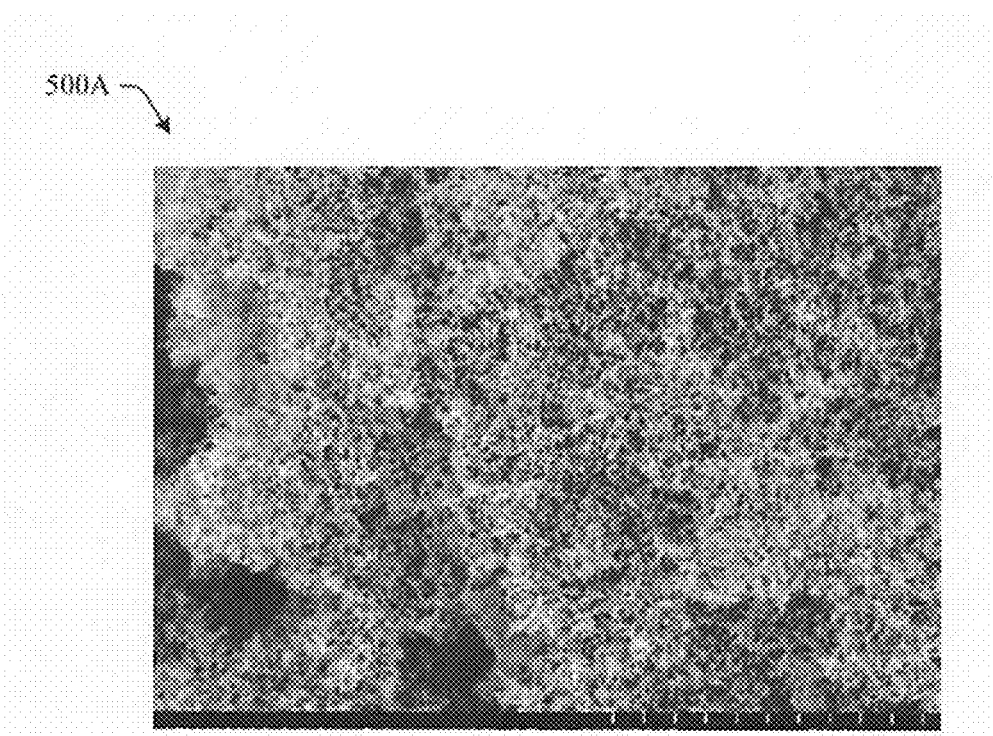
FIG. 5A        50.0 um
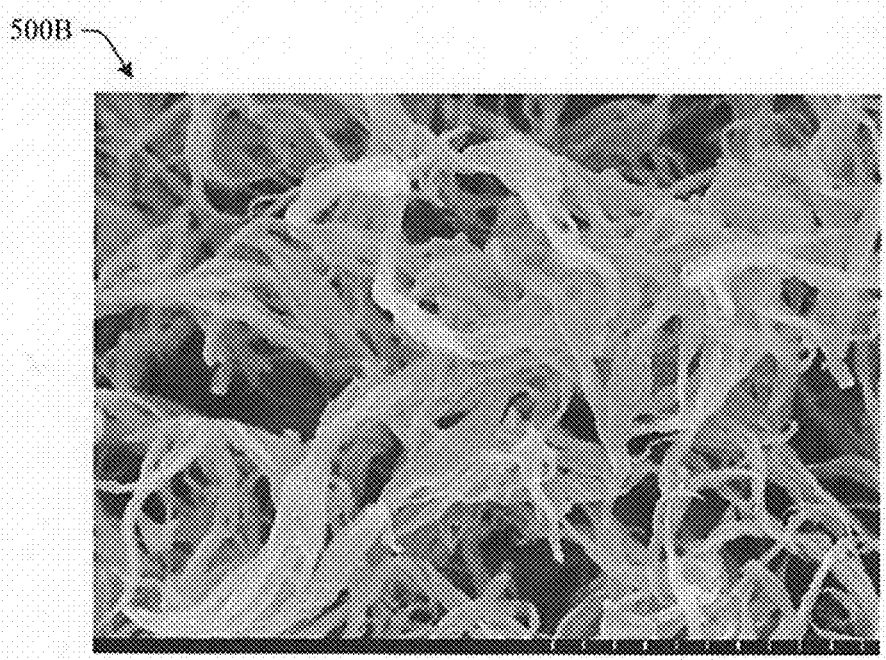
FIG. 5B        2.00 um

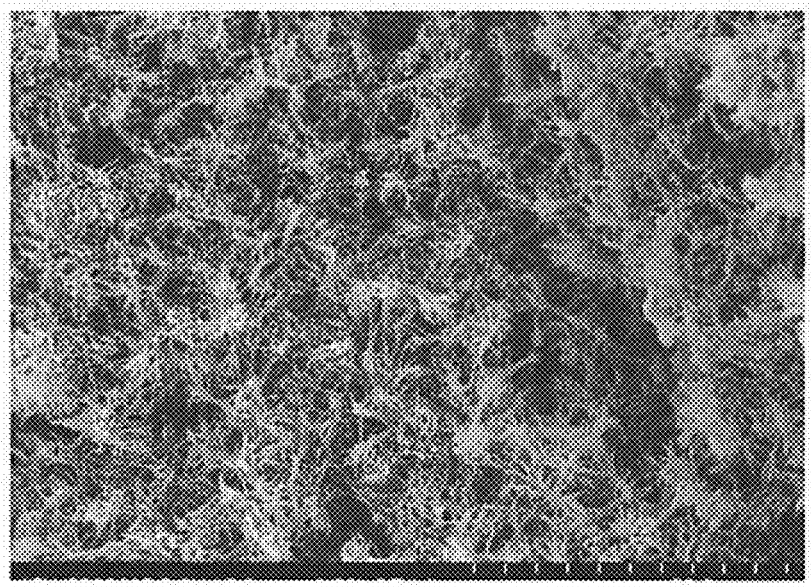
FIG. 5E  50.0 um
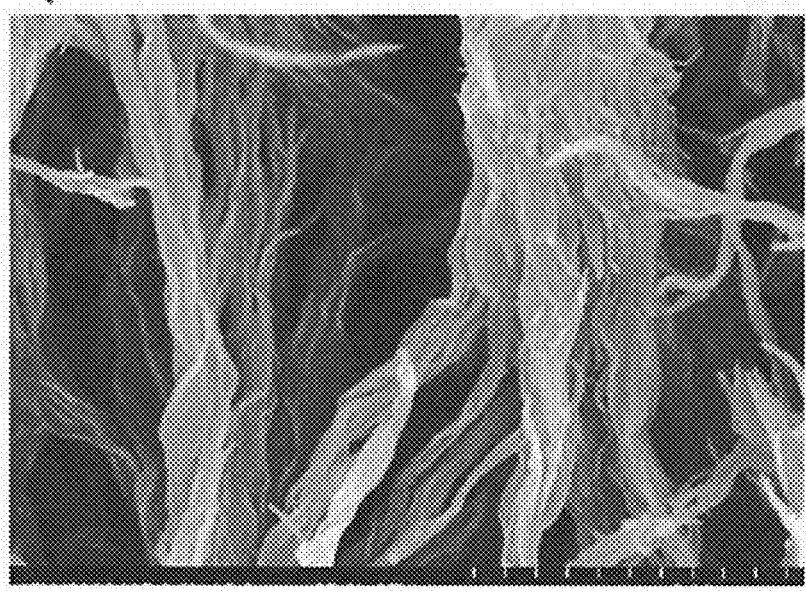
FIG. 5F  2.00 um

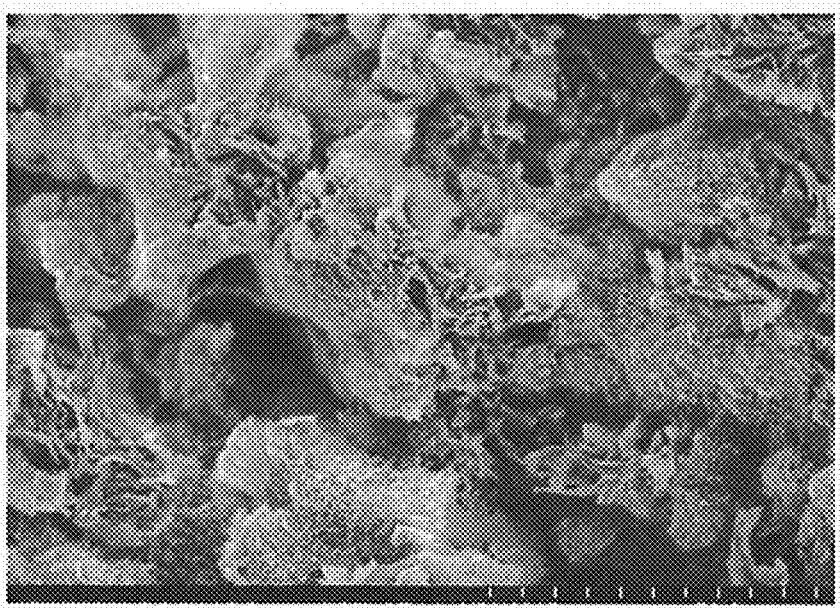
FIG. 5G    50.0 um
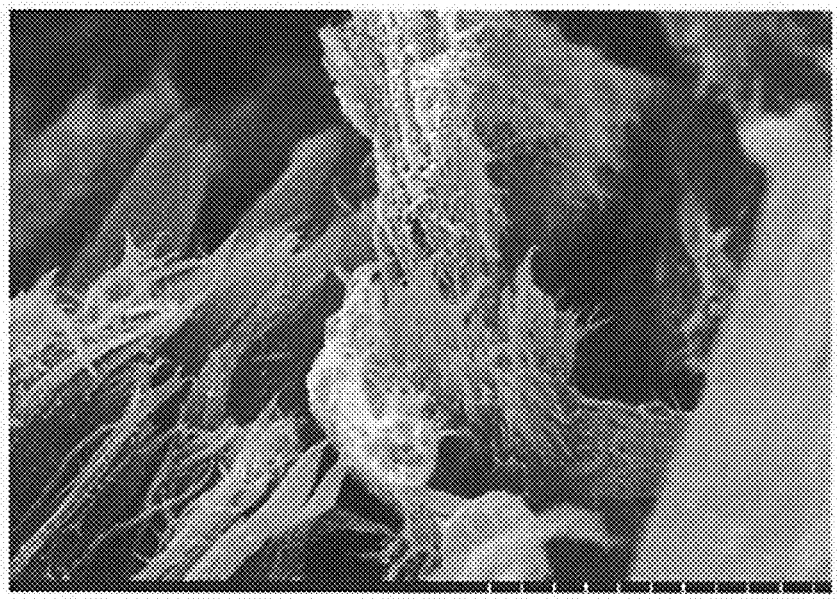
FIG. 5H    2.00 um

POLYAMIDE AEROGELS

CROSS-REFERENCE TO RELATED APPLICATIONS

This application claims the benefit of U.S. Provisional Patent Application Ser. No. 62/214,375 entitled "Polyamide Aerogels made from Poly(p-Phenylene Terephthalamide)" filed on Sep. 4, 2015. The entirety of the above-noted application is incorporated by reference herein.

ORIGIN OF THE INVENTION

The invention described herein was made by employees of the United States Government and may be manufactured and used by or for the Government for Government purposes without the payment of any royalties thereon or therefor.

BACKGROUND

Aerogels are unique high surface area materials that have promise as insulators, low dielectric substrates, low density core materials for sandwich structures and chemical separation media in applications where low density and low weight are desirable. Aerogels were first produced by using supercritical fluid extraction to remove liquid from a variety of gels, including silica, gelatin, agar, cellulose, and nitrocellulose, and replacing it with air. The first synthetic polymer aerogels were based on polycondensation of formaldehyde with resorcinol or melamine. Similar to inorganic alumina and silica aerogels, they possess high surface areas, low densities, and low thermal conductivity but are brittle and have poor mechanical properties.

Polymer aerogels of many types have been synthesized by removing the liquid from a polymer gel by some means. Gels formed by crystallization of linear polymers in solution are typically prepared by cooling hot solutions of polymers such as polyvinylidene fluoride (PVDF), poly(4-methyl-pentene-1) (i-P4MP1), and syndiotactic polystyrene (s-PS). Factors such as solvent choice and cooling rate dictate the types of crystalline morphologies and the amount of fibrous, amorphous regions that are present. Because of the controlled combination of crystalline and amorphous regions and the high porosity, syndiotactic polystyrene (s-PS) aerogels are valued as absorbents for volatile organic compounds.

Interest in improving the mechanical stability of aerogels has led to the development of covalently cross-linked aerogels composed of polymers such as polyurea, polyurethane, polyimide, and polyamide. The process for fabrication of covalently cross-linked gels typically begins with forming telechelic oligomers that gel after addition of a suitable cross-linker. This typically gives polymers with tailorable properties depending on the oligomer backbone and the cross-linker. For example, polyimide aerogels have been fabricated as thin films with good moisture resistance, as mechanically strong materials, and with low dielectric constants and demonstrated as substrates for lightweight antennas.

To fabricate cross-linked polyimide or polyamide aerogels, reactions are carried out in polar aprotic solvents at room temperature or lower and entail the condensation of bisnucleophiles with biselectrophiles to form step-growth oligomers. Control of the stoichiometric balance between the nucleophiles and electrophiles allows for control over the number of repeat units, n, of the oligomers formed in solution. Furthermore, it is possible to form oligomers end-capped with either two electrophilic or two nucleophilic sites based on the molar excess of bisnucleophile or biselectrophile. Cross-linkers for electrophilic end groups such as anhydrides or isocyanates have included aromatic triamines, such as 1,3,5-triaminophenoxybenzene (TAB), 1,3,5-tris(aminophenyl)benzene, 2,4,6-tri(aminophenyl)pyridine, and octa-aminophenylsilses-quioxane (OAPS). If the oligomers are capped with nucleophiles, such as amines, a reagent with three or more electrophilic moieties, such as 1,3,5-benzenetricarbonyl trichloride (BTC) or poly(maleic anhydride) can be used as a cross-linker to react with the end groups of the oligomers to create a three dimensional network which forms the gel.

Polyamide aerogels, produced as described above, using the inexpensive monomers, isophthaloyl chloride (IPC) and p-phenylene diamine (PPDA) and cross-linked with BTC had the highest Young's moduli reported to date for a polymer aerogel, compared on a same density basis. Furthermore, these linear crosslinked materials could be made without the use of an inert atmosphere, unlike previously reported polyamide aerogels made using isocyanates.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

In one aspect of the innovation, disclosed herein is innovative polyamide aerogel and method of fabricating same composed of poly-p-phenylene-terephthalamide. Solutions containing calcium chloride ($CaCl_2$) and para phenylenediamine (pPDA) in N-methylpyrrolidinone (NMP) at low temperature are reacted with terephthaloyl chloride (TPC). Polymerization proceeds over the course of five minutes resulting in gelation. Removal of the reaction solvent and $CaCl_2$ via solvent exchange followed by extraction with supercritical carbon dioxide provides aerogels with densities ranging from 0.1 to 0.3 g/cm3, depending on the concentration of calcium chloride, the formulated number of repeat units, n, and the concentration of polymer in the reaction mixture. These variables were assessed in a statistical experimental study to understand their effects on the properties of the aerogels. Aerogels made using at least 30 wt % $CaCl_2$ had the best strength when compared to aerogels of similar density. Furthermore, aerogels made using 30 wt % $CaCl_2$ exhibited the lowest shrinkage when aged at elevated temperatures. Due to their low cost and ease of fabrication with respect to other polymer aerogels, the polyamide aerogels have potential for use as insulators in building and construction applications and refrigeration, as well as a host of aerospace applications.

In another aspect, a method of creating a polyamide aerogel is provided that includes preparing a solution including calcium chloride and a diamine in a first solvent, cooling the solution to approximately 0° C., adding a solid diacid chloride to the solution, allowing the solution to gel, soaking the gel in a second solvent to remove first solvent and calcium chloride, subjecting the gel to supercritical drying to remove the second solvent; and drying the gel in a vacuum for a predetermined time period.

In still another aspect, an aerogel is provided that includes a microporous polyamide solid phase comprising the diacid chloride and diamine reacted to form polyamide chains.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE DRAWINGS

FIGS. 5A-5H illustrate scanning electron micrographs (SEM) at low and high magnification of selected samples from the experimental study in accordance with aspects of the innovation.

DETAILED DESCRIPTION

Figure 1:
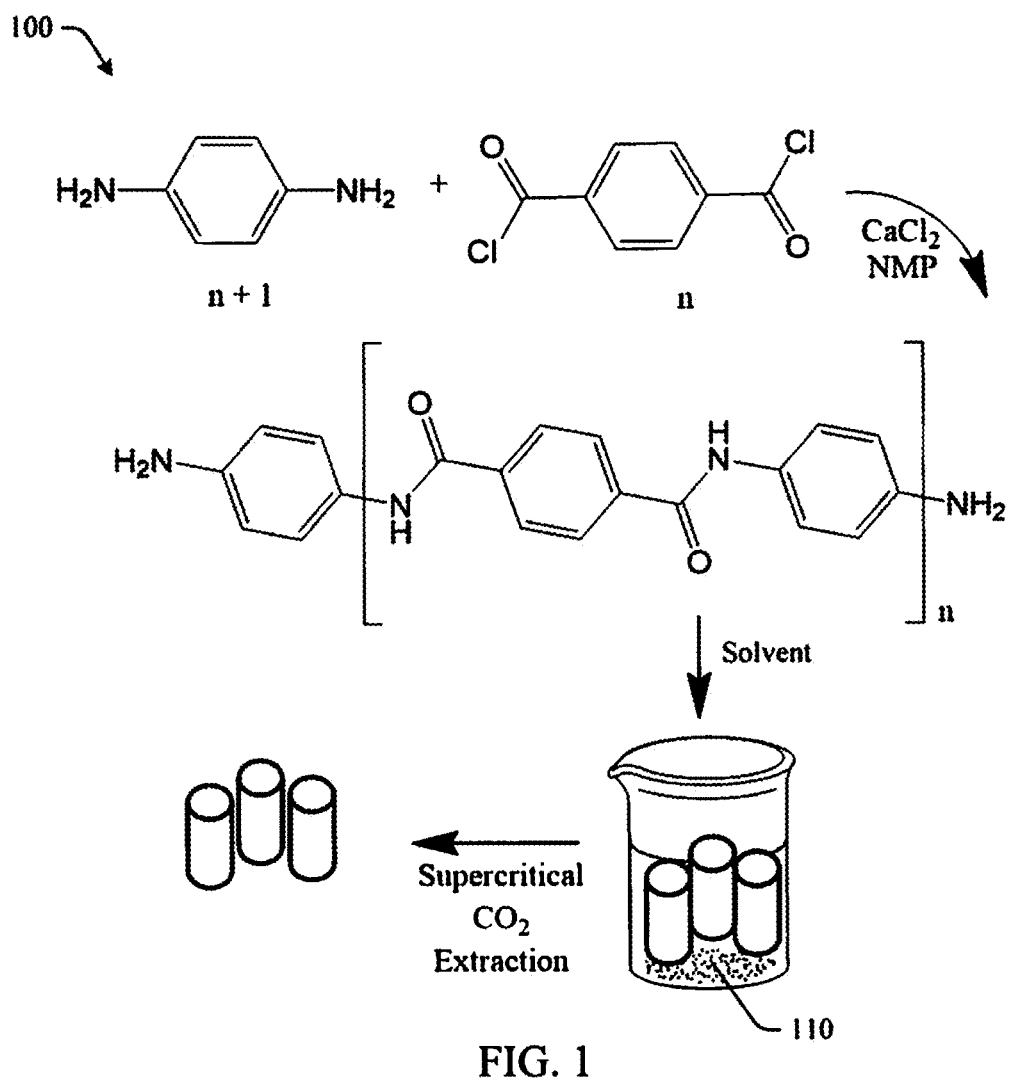
FIG. 1 illustrates a synthesis of an innovative polyamide aerogel in accordance with aspects of the subject innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details.

While specific characteristics are described herein (e.g., thickness, orientation, configuration, etc.), it is to be understood that the features, functions and benefits of the innovation can employ characteristics that vary from those described herein. These alternatives are to be included within the scope of the innovation and claims appended hereto.

While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

What follows is a more detailed discussion of certain compositions, articles, methods, materials, and apparatuses associated with aspects of the subject innovation. To aid in the understanding of aspects of the subject innovation, theoretical analysis and experimental results associated with specific experiments that were conducted are discussed herein. However, although for the purposes of obtaining the results discussed herein, specific choices were made as to the selection of various aspects of the experiments and associated setups—such as choice of materials (e.g., selection of diamine(s) or diacid chloride(s), solvent(s), relative concentration of isomers, etc.), solid concentration, repeat units, etc.—the compositions, articles, and methods described herein can be employed in other contexts, as well. For example, various aspects of the subject innovation can be utilized to produce aerogels for a variety of uses terrestrial or otherwise (e.g., as insulators, as low dielectric substrates, etc.). In some embodiments, different selections of materials or formulation parameters can be selected than those used in the experiments discussed herein, and may have differing characteristics, as explained in greater detail below. It is to be understood in the following examples and in the entire disclosure, while measurements (e.g., quantity, mass, weight, volume, concentrations, heating and cooling temperatures, density, measurements of time, etc.) are disclosed, these measurements are approximate and are not intended to limit the scope of the innovation.

Disclosed herein is an innovative polyamide aerogel (e.g., "gels" including a microporous solid and a gaseous dispersed phase) and method of fabricating the same composed of poly-p-phenylene-terephthalamide. The configuration of the innovative polyamide aerogel is an all-para substituted polymer gel that does not require the use of any type of cross-linker. The innovative polymer gel uses para-substituted monomers that have a similar chemical backbone as DuPont's Kevlar™. An advantage to this configuration is that the innovative polyamide aerogel maintains its shape during processing, which is an improvement over meta-substituted cross-linked polyamide aerogels.

A key characteristic of utilizing a polymer such as poly (p-phenylene-terephthalamide) is that by itself it is insoluble in most common laboratory and industrial solvents. This is the opposite of the polyamides of the prior art which exhibit a high degree of polymer solvent interaction. However, it is important to have enough solubility in a given polymer solvent system for the reactants, such as monomers to have continued opportunity for interaction and reaction prior to gelation. For this reason, calcium chloride or lithium chloride is added in order to temporarily break up the hydrogen bonding enough for complete reaction thereby forming polyamide chains and allowing gelation to occur. By controlling the amount of these salts that are employed in the reaction we are able to have a high degree of control over the polymer-polymer vs. polymer-solvent interactions and by extension the degree, if any, to which these materials undergo distortion during processing.

Aerogels are unique high surface area materials that have promise as insulators, low dielectric substrates, low density core materials for sandwich structures and chemical separation media in applications where low density and low weight are desirable. Aerogels were first produced by using supercritical fluid extraction to remove the liquid from a variety of gels, including silica, gelatin, agar, cellulose, and nitrocellulose, and replacing it with air. Others created the first synthetic polymer aerogels based on polycondensation of formaldehyde with resorcinol or melamine. Similar to inorganic alumina and silica aerogels, they possess high surface areas, low densities, and low thermal conductivity but are brittle and have poor mechanical properties.

Polymer aerogels of many types have been synthesized by removing the liquid from a polymer gel by some means. Gels formed by crystallization of linear polymers in solution are typically prepared by cooling hot solutions of polymers such as polyvinylidene fluoride (PVDF), poly(4-methylpentene-1) (i-P4MP1), and syndiotactic polystyrene (s-PS). Factors such as solvent choice and cooling rate dictate the types of crystalline morphologies and the amount of fibrous, amorphous regions that are present. Because of the controlled combination of crystalline and amorphous regions and the high porosity, syndiotactic polystyrene (s-PS) aerogels are valued as absorbents for volatile organic compounds.

The innovation disclosed herein utilizes the same technique of incorporating calcium chloride in solution with PPDA and TPC to fabricate polyamide aerogels. As described above, however, gelation occurs too rapidly when cross-linkers are added. Thus, the innovative aerogel is not covalently cross-linked. The innovation also varies the rate of gelation by varying the formulated number of repeat units, n, in the oligomer as well as the calcium chloride concentration and the total concentration of polymer in solution.

Referring now to the figures, FIG. 1 illustrates a synthesis 100 of an innovative polyamide aerogel based on para substituted monomers in accordance with an aspect of the innovation. Materials used in the synthesis are anhydrous N-methylpyrrolidinone (NMP), isophthaloyl chloride (IPC), and terephthaloyl chloride (TPC). It is to be understood that other diamines and diacids may be used, such as but not limited to, m-phenylene diamine, oxydianiline, dimethylbenzidine, methylene dianiline, and isophthaloyl dichloride. The synthesis is carried out by combining PPDA and TPC in NMP in the presence of calcium chloride and allowing the gelation to occur, followed by a solvent exchange using a solvent 110 capable of dissolving $CaCl_2$ (e.g., ethanol, methanol, acetone, etc.) and miscible with liquid $CO_2$ and then supercritical $CO_2$ extraction is performed. It is to be understood that other types of salts may be used in lieu of calcium chloride, such as but not limited to, lithium chloride.

More specifically, 18 experimental runs were performed using a calcium chloride concentration, where the formulation number of repeat units in the polymer backbone and the total polymer concentration in solution is varied. The results of the experimental runs are illustrated in Table 1.

TABLE 1

| Run | Repeat units, n | Polymer conc., wt % | $CaCl_2$ conc., % | Density, $g/cm^3$ | Porosity, % | Shrinkage, % | Surface area, $m^2/g$ | Modulus, MPa | Stress @ 10% strain, MPa |
|---|---|---|---|---|---|---|---|---|---|
| 1 | 60 | 5 | 40 | 0.143 | 90.7 | 27.5 | 295 | 57.1 | 1.04 |
| 2 | 40 | 5 | 30 | 0.106 | 93.0 | 21.3 | 249 | 16.9 | 0.21 |
| 3 | 20 | 7.5 | 30 | 0.152 | 89.6 | 20.3 | 285 | 38.5 | 0.51 |
| 4 | 20 | 5 | 20 | 0.117 | 92.0 | 24.9 | 260 | 2.03 | 0.04 |
| 5 | 20 | 10 | 40 | 0.265 | 81.8 | 25.3 | 290 | 163.9 | 2.68 |
| 6 | 40 | 7.5 | 20 | 0.164 | 88.7 | 21.5 | | 7.14 | 0.24 |
| 7 | 40 | 7.5 | 30 | 0.164 | 88.8 | 21.9 | 259 | 28.8 | 0.56 |
| 8 | 60 | 7.5 | 30 | 0.155 | 89.5 | 19.7 | 240 | 63.7 | 0.70 |
| 9 | 40 | 10 | 30 | 0.226 | 84.5 | 22.7 | 286 | 62.9 | 1.53 |
| 10 | 40 | 7.5 | 30 | 0.158 | 89.4 | 20.6 | 247 | 54.3 | 0.60 |
| 11 | 60 | 5 | 20 | 0.124 | 92.0 | 25.2 | 215 | 0.53 | 0.040 |
| 12 | 20 | 5 | 40 | 0.097 | 93.9 | 17.6 | 258 | 25.8 | |
| 13 | 40 | 7.5 | 30 | 0.158 | 89.4 | 20.7 | 248 | 26.3 | 0.63 |
| 14 | 60 | 10 | 20 | 0.206 | 85.6 | 19.5 | 281 | 24.7 | 0.58 |
| 15 | 40 | 7.5 | 30 | 0.160 | 89.7 | 20.9 | 278 | 70.1 | 0.65 |
| 16 | 40 | 7.5 | 30 | 0.156 | 89.7 | 20.9 | 274 | 42.8 | 0.63 |
| 17 | 60 | 10 | 40 | 0.286 | 80.5 | 28.1 | 274 | 82.7 | 2.70 |
| 18 | 20 | 10 | 20 | 0.190 | 87.3 | 18.3 | 250 | 12.2 | 0.48 |

Figure 2:
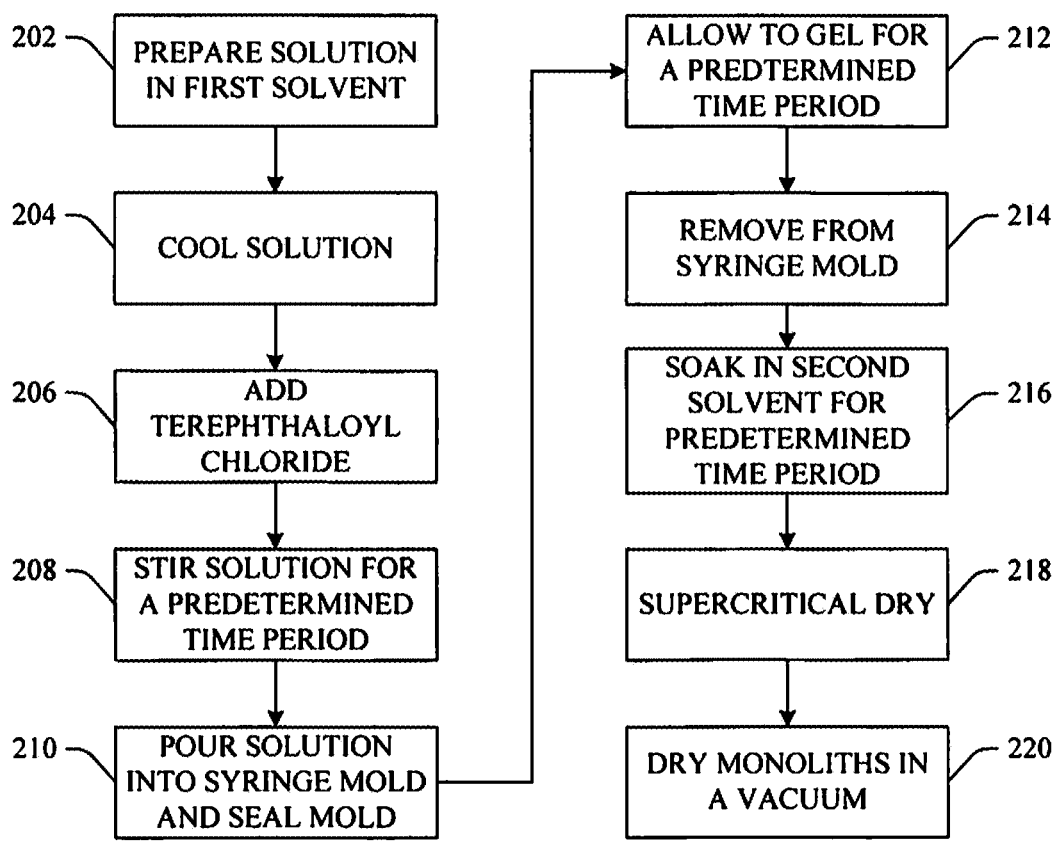
FIG. 2 illustrates a method of fabricating a polyamide aerogel in accordance with aspects of the subject innovation.

Referring to FIG. 2, an example run is comprised of the following process. For illustration purposes only, run number 10 will be described where a 30 wt % calcium chloride was used, the number of repeat units (n) is 40, and having a 7.5 wt % total polymer concentration. At 202, a solution of calcium chloride (2.25 g, 20.27) and a para-substituted monomer (p-phenylene diamine (3.45 g, 31.90 mmol)) is prepared in a first solvent (e.g., NMP (89.98 mL)) is prepared. At 204, the solution is cooled to approximately 0° C. using an ice water bath where upon cooling, the solution became opaque. At 206, another para-substituted monomer (solid terephthaloyl chloride (6.32 g, 31.12 mmol)) is added, which causes the solution to become transparent. At 208, after a first time period (e.g., several minutes) of stirring the transparent yellow solution becomes cloudy while simultaneously, the viscosity of the solution increases. At 210, after a second time period (e.g., several more minutes) of stirring, the solution is poured into syringe molds that are prepared by removing the ends from the syringes. Once sealed, at 212, the syringe molds and the solution contents sit for a predetermined time period (e.g., overnight) at room temperature resulting in cylindrical monoliths. At 214, the resulting yellow cylindrical monoliths are removed from the syringe molds. At 216, the monoliths soak in a second solvent 110 for a predetermined time period (e.g., five days) that is miscible with liquid $CO_2$ to facilitate removal of all the first solvent and $CaCl_2$ prior to and during the supercritical drying phase of the process. The solvent 110 is removed and replaced with fresh solvent 110 each day. At 218, once the solvent exchange process is complete, the cylindrical monoliths are subjected to supercritical drying using $CO_2$. At 220, the monoliths are then dried in vacuum at approximately 70° C. overnight, which, in this example experimental run produces off-white polyamide aerogels with a density of 0.15 $g/cm^3$.

The polyamide aerogels are made according to the configuration in FIG. 1 from PPDA and TPC using calcium chloride to keep the polyamide in solution until gel formation. Three variables were investigated in the experimental study to assess their effect on the resulting aerogel properties. First, the amount of polymer in solution was varied from 5 to 10 wt % in order to vary the density of the aerogels, the $CaCl_2$ was varied from 20 to 40% of the polymer weight, and finally the polyamides were formulated with amine end caps as a way of trying to control the molecular weight of the polymers. The experimental study was carried out using statistical experimental design methodology. A face-centered central composite design in three variables was utilized with the fifteen different formulations made plus three repeats of the center point in the design to assess model reliability and reproducibility. Table 1 above shows the formulations made along with the measured responses. The experiments were analyzed using multiple linear regression to create empirical models of the effect of the variables on all measured responses.

Figure 3:
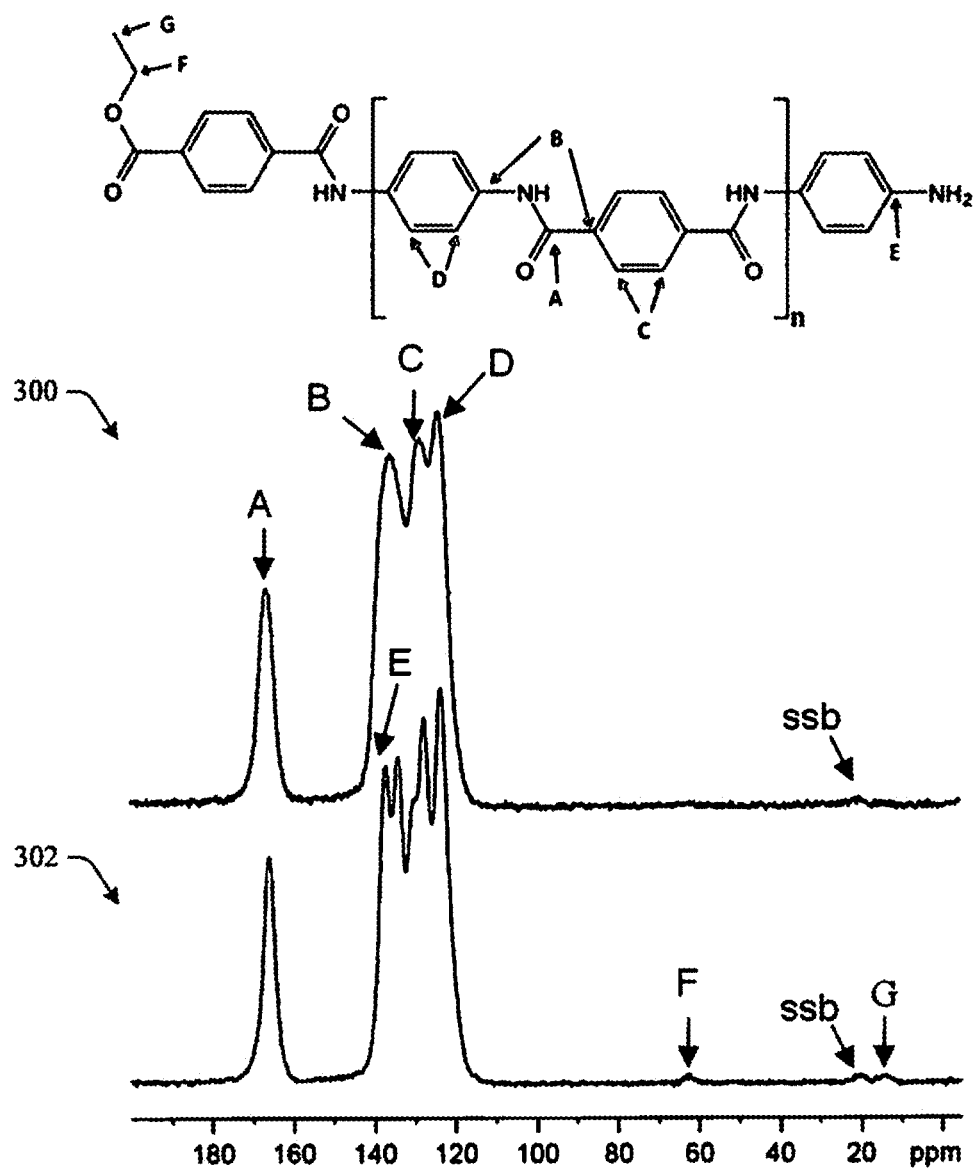
FIG. 3 illustrates Nuclear Magnetic Resonance (NMR) spectra for two representative formulations in an experimental study in accordance with aspects of the innovation.

FIG. 3 shows solid Nuclear Magnetic Resonance (NMR) spectroscopy of the different formulations of polyamide aerogel from the experimental study. The top graph shows the spectrum 300 of experimental run 17 from Table 1 above, which was made using 40% $CaCl_2$ and a formulated n of 60. In this spectrum, the peak at 166.6 ppm can be assigned to the amide carbonyls (A). In addition, there are three distinct aromatic peaks at 135.5 ppm (carbons attached carbonyl or nitrogen, B), 128.9 ppm (secondary carbons in amide phenyl ring, C) and 124.0 ppm (secondary carbons of amine phenyl ring, D).

In contrast, the bottom graph in FIG. 3 shows the spectrum 304 of experimental run 14, which is also formulated with an n of 60 but was made using only 20% $CaCl_2$. In this spectrum, a fourth aromatic peak is appearing more downfield at 1373 ppm. This peak can most likely be assigned to an aromatic carbon substituted with unreacted amine. In addition, two small peaks are seen at 62 ppm (F) and 18 ppm (G), which may belong to ethyl ester, formed from the reaction of an unreacted acid chloride and ethanol during the first solvent wash. Both of these observations taken together are strong evidence that lower molecular weight oligomers are obtained when too little $CaCl_2$ is used in the synthesis. All spectra of aerogels in the study made using 20% $CaCl_2$ display these extra peaks, while all other aerogels in the study show no evidence of end groups, indicating that high molecular weight polymers are obtained.

Figure 4A:
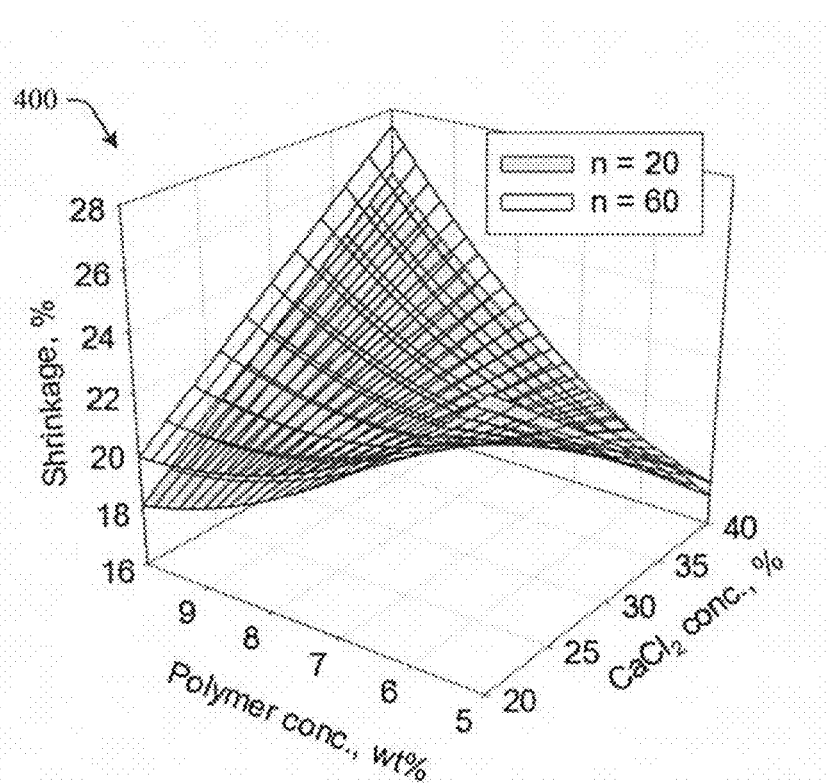
FIGS. 4A-4D illustrate empirical models for shrinkage, density, $CaCl_2$ content, and porosity respectively for polyamide aerogels in the experimental study in accordance with aspects of the innovation.

FIGS. 4A-4D represent graphical empirical models for shrinkage 400, density 410, $CaCl_2$ content 420, and porosity 440 respectively. As illustrated in FIG. 4A, aerogels made using the highest polymer concentration and $CaCl_2$ concentration shrink the most (as much as 28%) during processing. There is, however, a synergistic, interactive effect of $CaCl_2$ concentration and polymer concentration on shrinkage. Shrinkage greatly increases with increasing $CaCl_2$ concentration at 10 wt % polymer, but slightly decreases with increasing $CaCl_2$ at 5 wt % polymer. Since $CaCl_2$ concentration is based on polymer concentration, this could be because higher amounts of $CaCl_2$ were employed overall when polymer concentration is at 10 wt %. If $CaCl_2$ were varied completely independently from polymer concentration, the synergistic effect might not be significant.

Figure 4B:
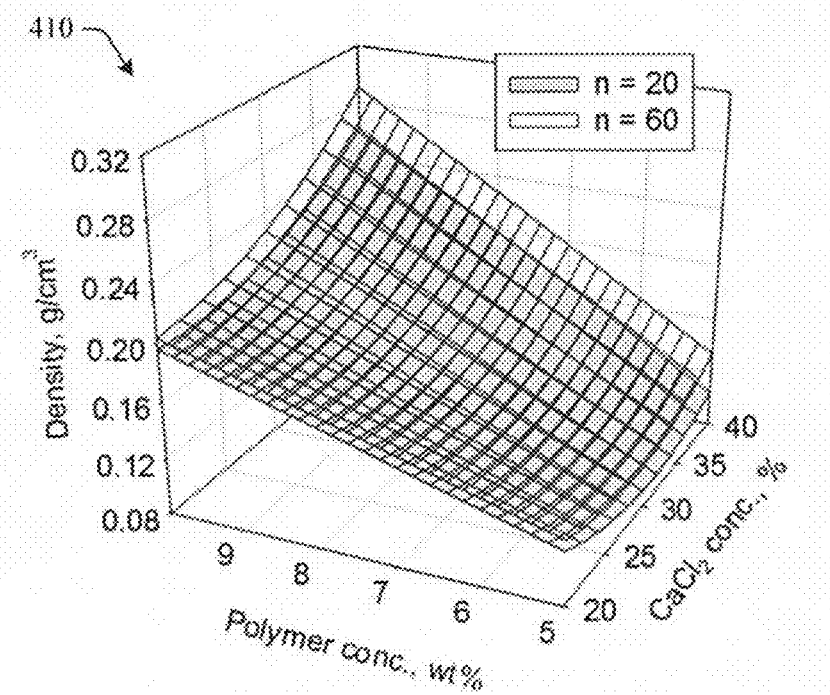
Figure 4C:
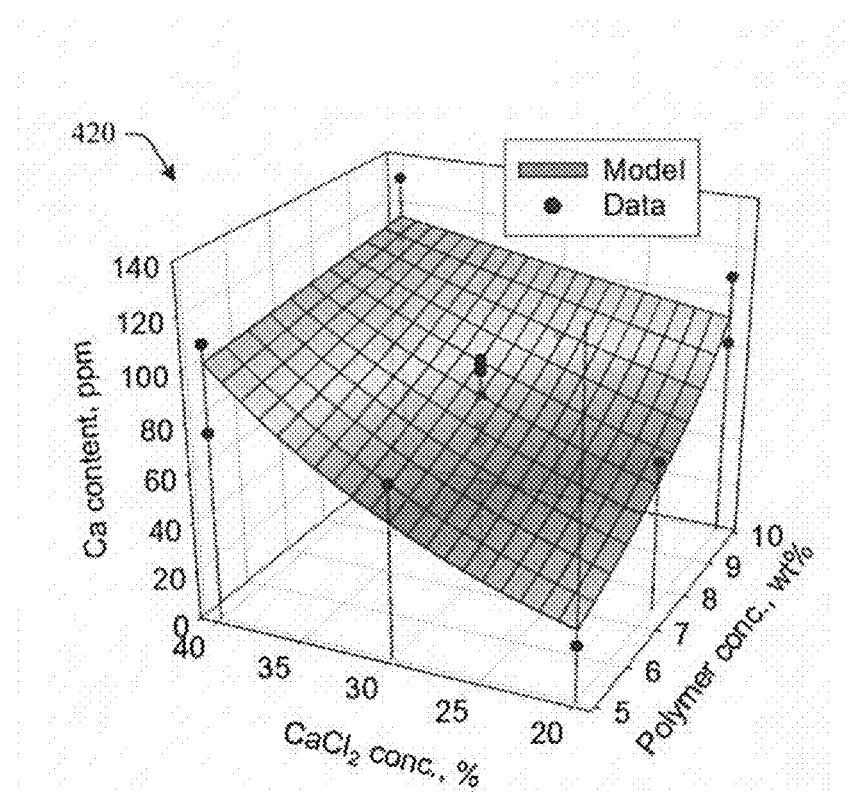

Referring to FIG. 4B, density of the aerogels is expected to increase with increasing polymer concentration and does so at all $CaCl_2$ concentrations, even though shrinkage decreases with increasing polymer concentration at 20% $CaCl_2$. This is surprising since density is largely dependent on shrinkage. It also depends, however, on all of the monomers being retained in the form of polymer after processing. As the NMR spectra show in FIG. 3, polymerization is not complete when 20% $CaCl_2$ is used. Thus, density may not go up as shrinkage increases at low $CaCl_2$ concentration because some low molecular weight oligomers may be lost to solvent washes. It was initially thought that $CaCl_2$ left in the aerogels as polymer concentration and $CaCl_2$ are increased may increase density. As shown in FIG. 4C, however, the $CaCl_2$ is mostly washed out during solvent exchanges and supercritical fluid extraction and the measured amount of Ca remaining in the samples is less than 120 ppm for all aerogels in the study.

Figure 4D:
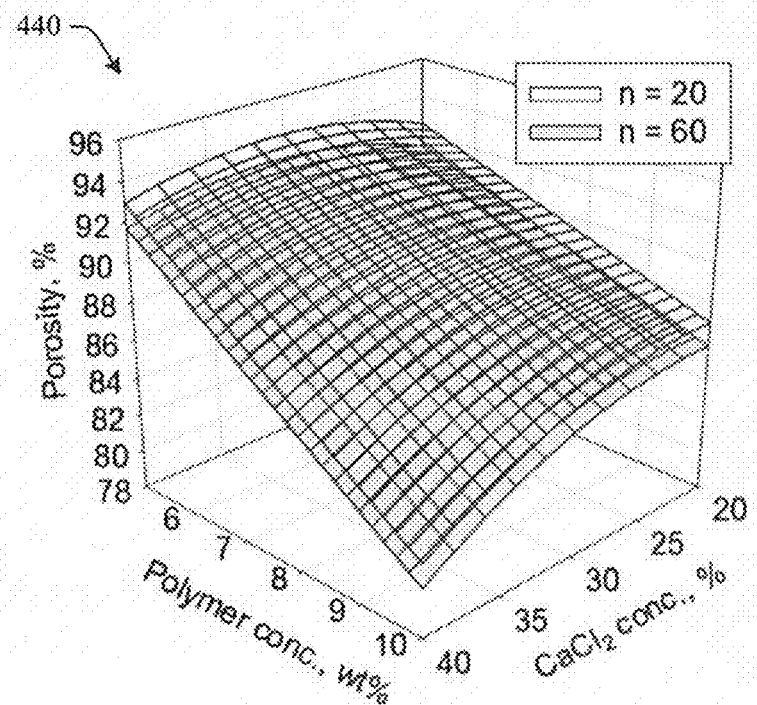

Referring to FIG. 4D, porosity decreases with increasing polymer concentration and increasing $CaCl_2$ concentration. This is the opposite of the trends seen for density. The number of repeat units, n, has a small though significant effect on shrinkage, density and porosity, with density increasing at higher n and porosity decreasing at higher n. For Ca content remaining in the aerogels after processing, n was not a factor over and above standard error.

Figure 5C:
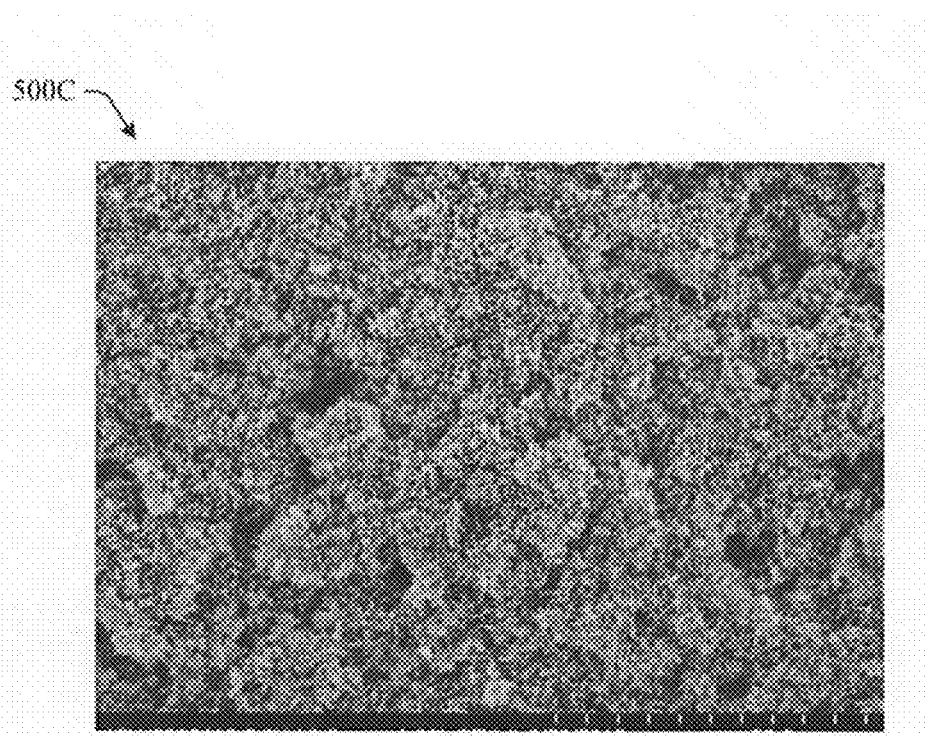
Figure 5D:
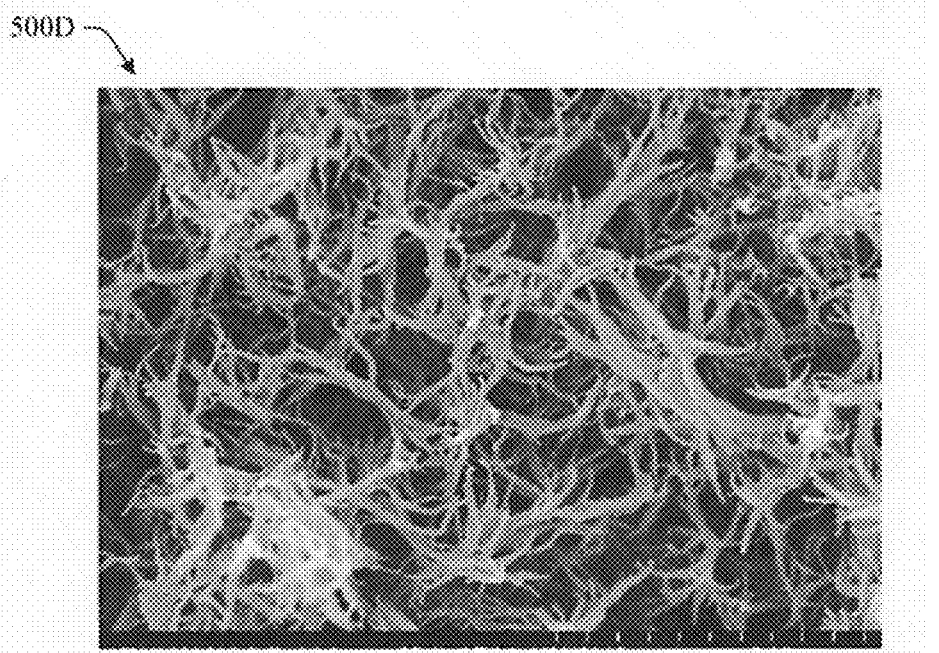

FIGS. 5A-5H are Scanning Electron Micrographs (SEM) 500A-500H at a low magnification (FIGS. 5A, 5C, 5E, and 5G) and at a high magnification (FIGS. 5B, 5D, 5F, and 5H) of selected samples from the experimental study. As illustrated, there is a coarsening of the morphology as the polymer concentration and $CaCl_2$ concentration are increased. At low magnification, the aerogel made with the lowest polymer and $CaCl_2$ concentration (FIG. 5A) appears very uniform and fibrous, while that made with the highest polymer and $CaCl_2$ concentration (FIG. 5G) looks more sheet-like or papery. At higher magnification, it appears that the aerogels made with low $CaCl_2$ concentration (FIGS. 5B and 5D) have smaller diameter fibers, while the fibers appear to coalesce into larger bundles and sheets in the aerogels made with higher $CaCl_2$ concentration (FIGS. 5F and 5H).

Figure 6A:
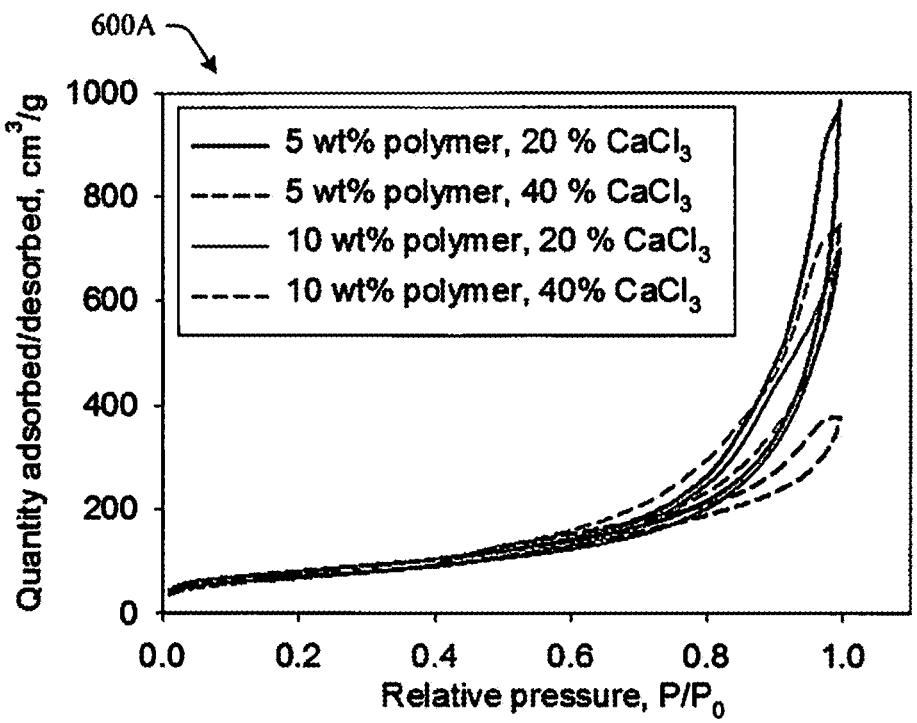
FIGS. 6A and 6B illustrate nitrogen sorption/desorption isotherms for a selective sampling of aerogels from the study in accordance with aspects of the innovation.
Figure 6B:
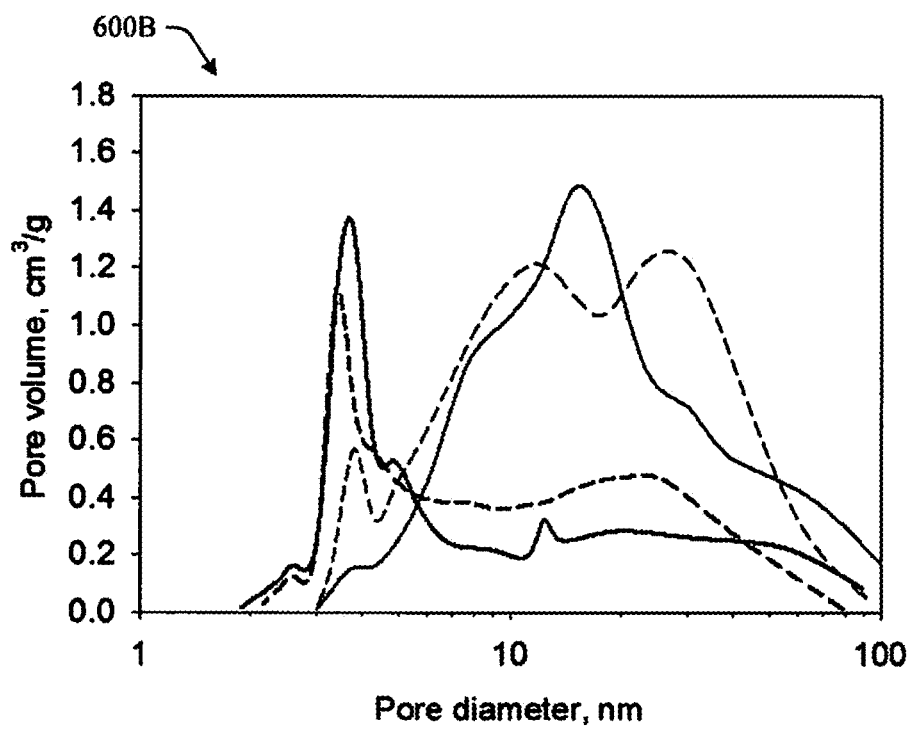

Referring to FIGS. 6A and 6B, nitrogen sorption was performed on all of the aerogel formulations in the study and analyzed using the Brunauer-Emmett-Teller method (BET). FIG. 6A shows the nitrogen sorption/desorption isotherms 600A for a selective sampling of aerogels from the study. The isotherms are IUPAC type IV curves with an HI hysteresis loop, which indicate that the materials are mesoporous.

FIG. 6B shows the pore size distributions 600B of the same samples as shown in FIG. 4A labelled the same way. The black traces show distributions for samples made with 5 wt % polymer concentration, clearly indicating that mostly very small pore sizes (under 4 nm) are obtained under this condition with broad peaks growing in as $CaCl_2$ concentration is increased (dashed line). In contrast, the red traces are from aerogels made using 10 wt % polymer show a very broad distribution ranging from ten up to 100 nm and very little of the 3 nm size pores. This is in keeping with the coarsening of the morphology as seen by SEM with increasing polymer concentration and $CaCl_2$.

Figure 7:
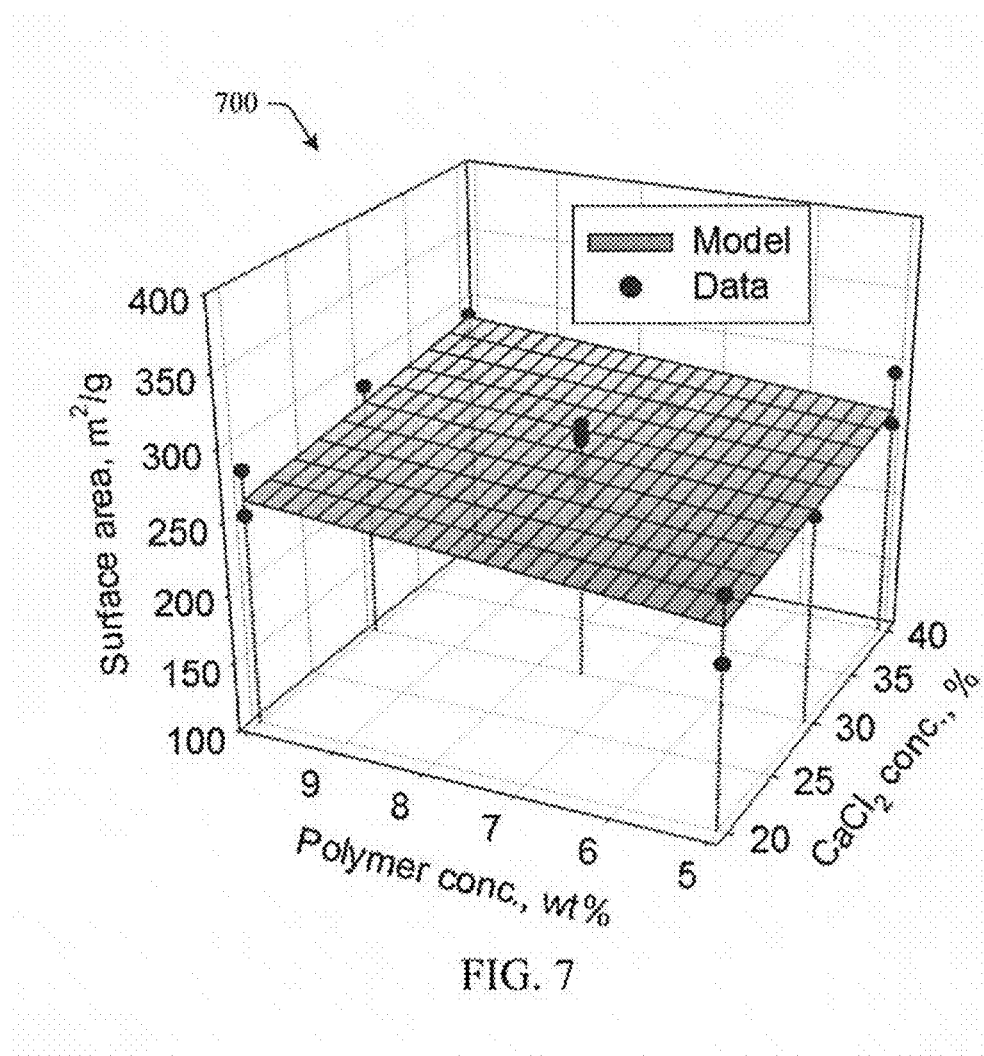
FIG. 7 illustrates an empirical model of Brunauer-Emmett-Teller BET method surface area graphed vs. polymer concentration and $CaCl_2$ concentration in accordance with aspects of the innovation.

Referring to the graphic 700 in FIG. 7, it may be expected to find that the surface areas might be smaller for aerogels made with higher $CaCl_2$ and polymer concentration from the course appearance of the SEMs. The surface areas, however, did not vary very much across the study, ranging from 200 to 300 $m^2/g$. As shown in FIG. 7, there is a slight though significant increase in surface area with increasing $CaCl_2$ and polymer concentration.

Figure 8A:
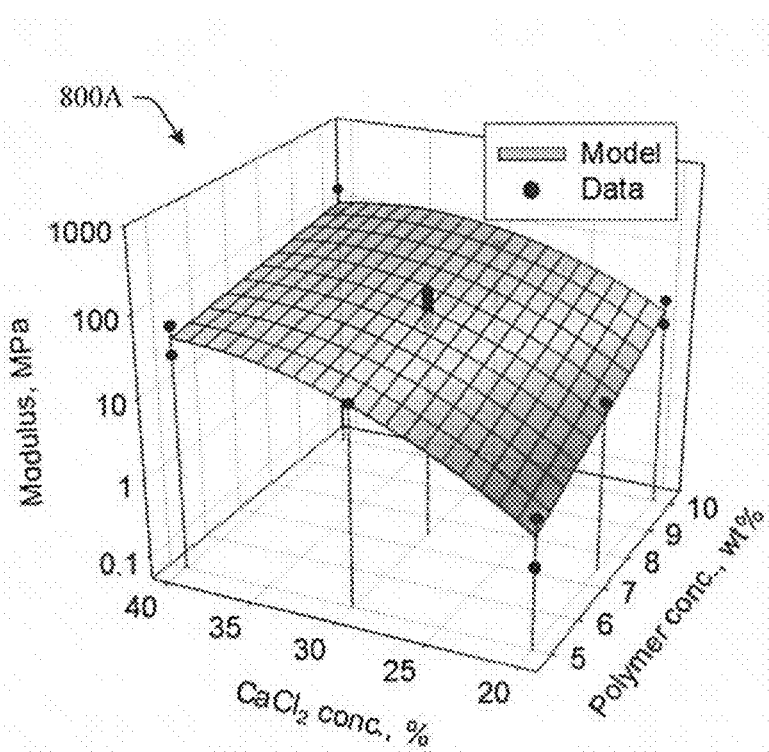
FIGS. 8A and 8B illustrate empirical models for compressive modulus and stress at 10% strain respectively in accordance with aspects of the innovation.
Figure 8B:
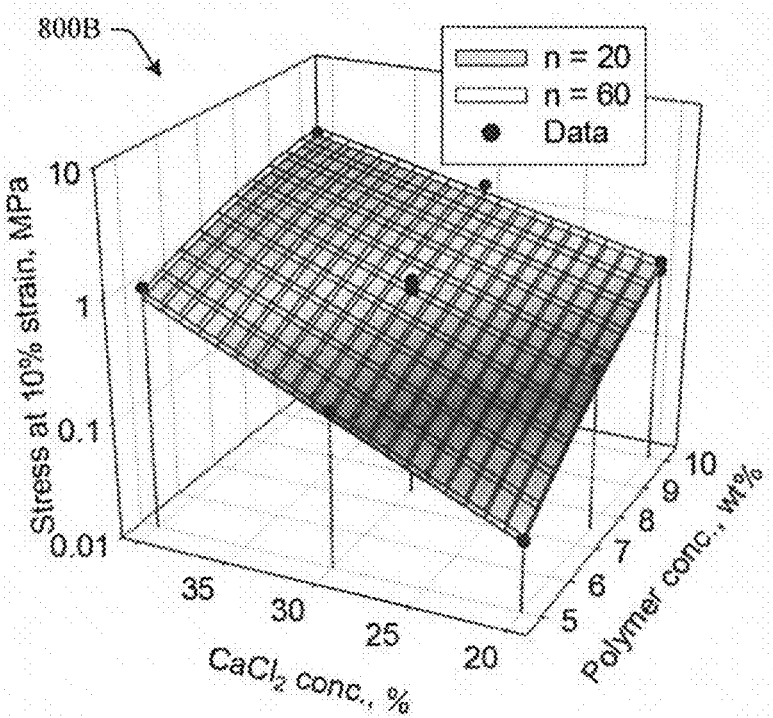
Figure 8C:
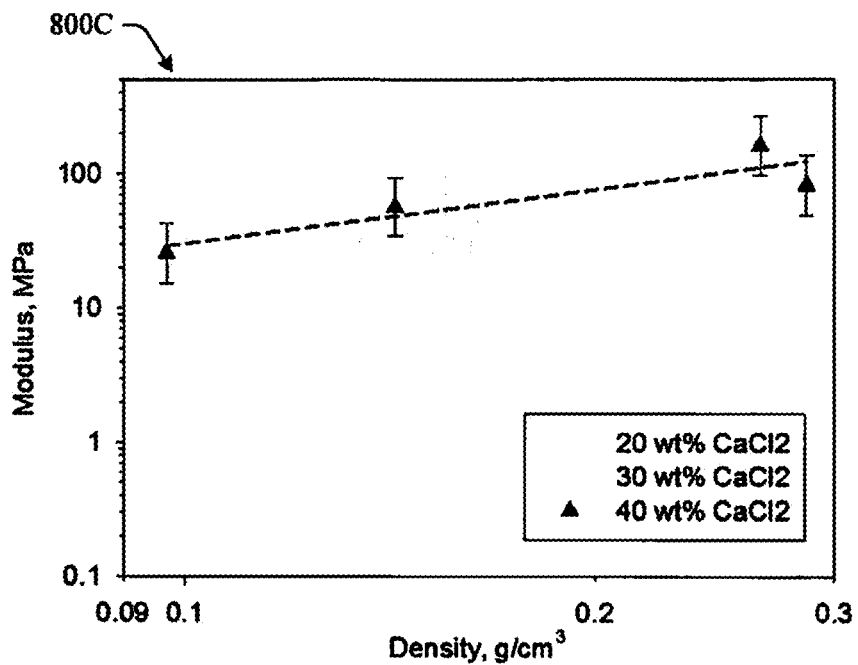
FIGS. 8 C and 8D illustrate log log plots of modulus vs. density and stress at 10% strain vs. density respectively with different amounts of $CaCl_2$ concentration in accordance with aspects of the innovation.
Figure 8D:
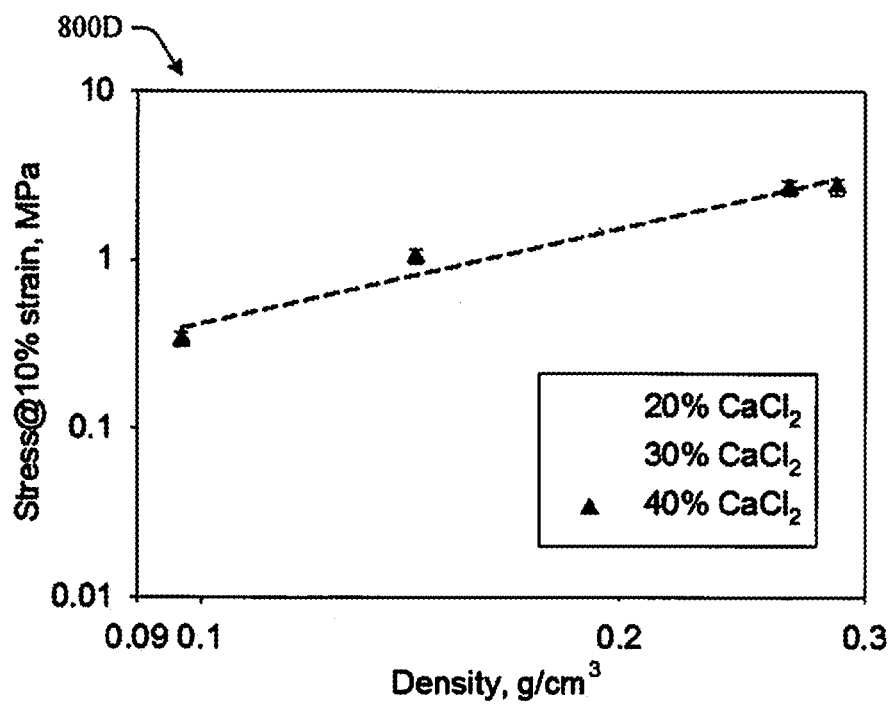

Referring to the graphs in FIGS. 8A-8D, compression tests of the aerogels were carried out to monitor changes in mechanical performance due to the variables studied. An empirical model for Young's modulus taken as the initial slope of the stress strain curves 800A of the aerogels is shown in FIG. 8A. FIG. 8B illustrates the empirical model graph 800B for compressive strength taken as the stress at 10% strain. As illustrated, both the modulus and compressive strength increase with increasing polymer concentration and $CaCl_2$ concentration.

As seen, however, in the log plots 800C, 800D of modulus (FIG. 8C) and compressive strength (FIG. 8D) vs. density, higher concentrations of $CaCl_2$ lead to higher modulus and strength at the same density. This supports the notion that higher concentrations of $CaCl_2$ lead to more complete polymerization and higher molecular weight polymers. This is especially evident when polymer concentration is low—and the lowest density aerogels are produced—where increasing $CaCl_2$ concentration from 20 to 40% produces an order of magnitude higher modulus and compressive strength. The formulated number of repeat units did not have a significant effect on mechanical properties, further indicating that the molecular weight of the polymers is controlled by the $CaCl_2$ concentration and the ability of the salt to keep the polymer in solution.

Figure 9:
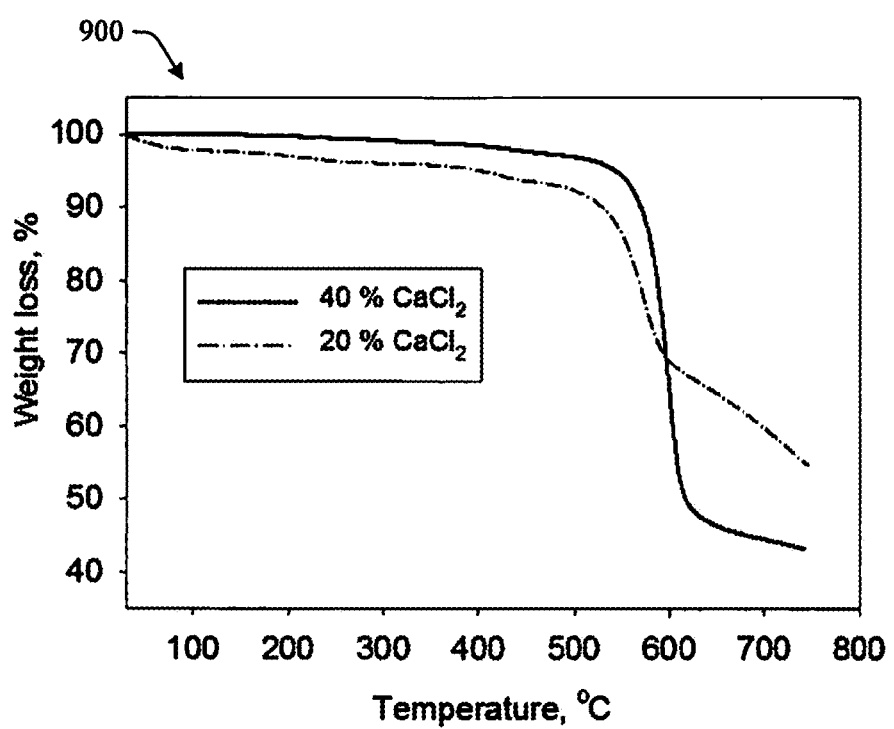
FIG. 9 illustrates a thermal gravimetric analysis (TGA) of polyamide aerogels made using different amounts of $CaCl_2$ in accordance with aspects of the innovation.

Referring to FIG. 9, Thermal Gravimetric Analysis (TGA) 900 of the polyamide aerogels shows that the onset of decomposition is above approximately 500° C. This is slightly lower than onsets of decomposition for polyimide aerogels, which may be over 600° C., depending on backbone. However, the polyimide aerogels tend to undergo shrinkage of 10 to 30% depending on backbone structure when heated to temperatures as low as approximately 150° C., which limits their use. This shrinkage tends to occur during the first 24 hours of heating and then levels off; hence, the polyimide aerogels can be conditioned for use at a particular temperature, but the density is higher leading to higher thermal conductivity or higher dielectric constants.

Figure 10A:
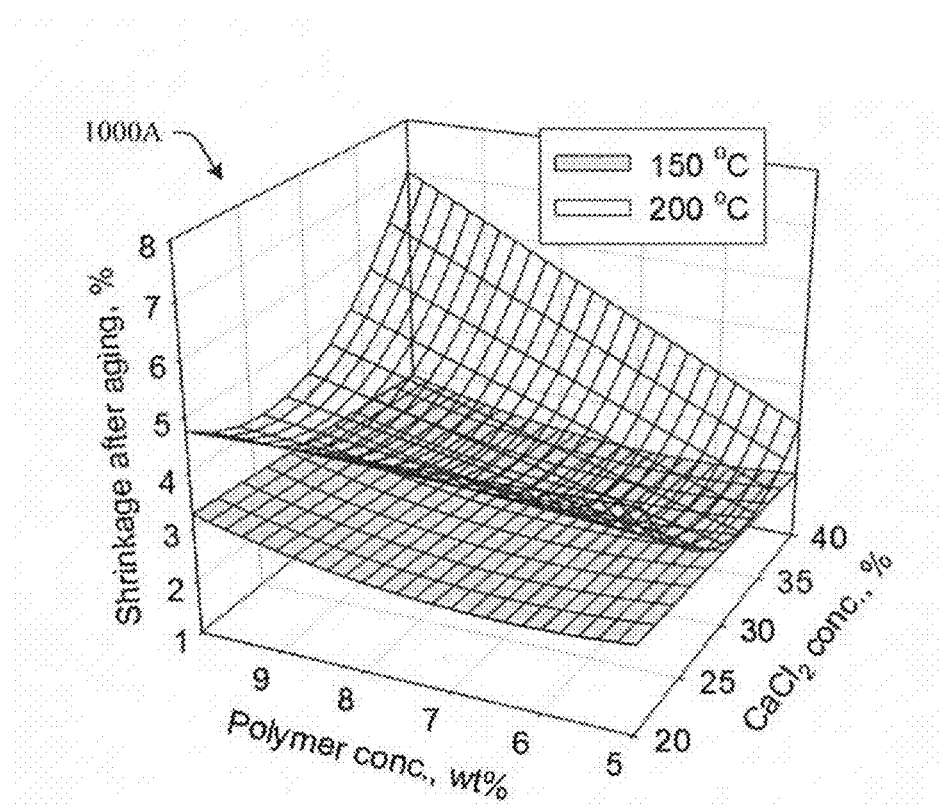
FIGS. 10A and 10B illustrate empirical models for shrinkage and density respectively after exposure to approximately 150° C. and approximately 200° C. for approximately 24 hours in accordance with aspects of the innovation.
Figure 10B:
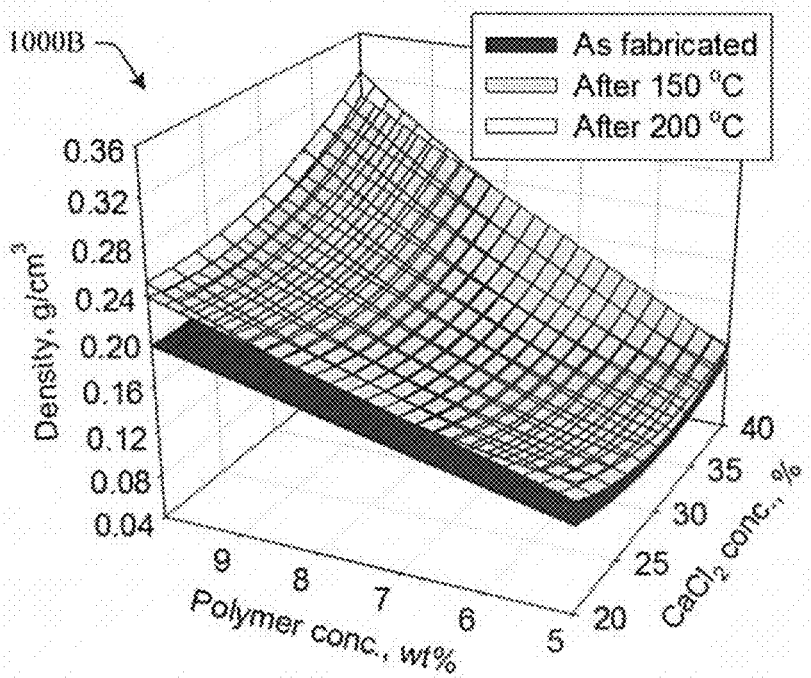

Referring to FIGS. 10A and 10B, to evaluate the higher temperature performance of the polyamides in regards to shrinkage, the aerogels in the study were heated in a flowing air oven at approximately 150° C. and approximately 200° C. for approximately 24 hours. FIG. 10A shows the empirical model graph 1000A for shrinkage during aging. As shown in the graph, the polyamide aerogels are much more dimensionally stable than the polyimide aerogels, shrinking only 2 to 3% after heating at approximately 150° C. and 2 to 7% after approximately 200° C. Shrinkage increases with increasing polymer concentration, while $CaCl_2$ concentration has a second order effect on shrinkage with minimum shrinkage occurring at about 30 to 35%. Since shrinkage is lower, the density increase due to shrinkage is much less than has been seen for polyimide aerogels, as shown in the graph 1000B in FIG. 10B. At 5% polymer concentration, the density increase due to shrinkage was negligible while at 10 wt % polymer concentration, the density increased only by about 0.04 $g/cm^3$ at all levels of $CaCl_2$ concentration.

Figure 11A:
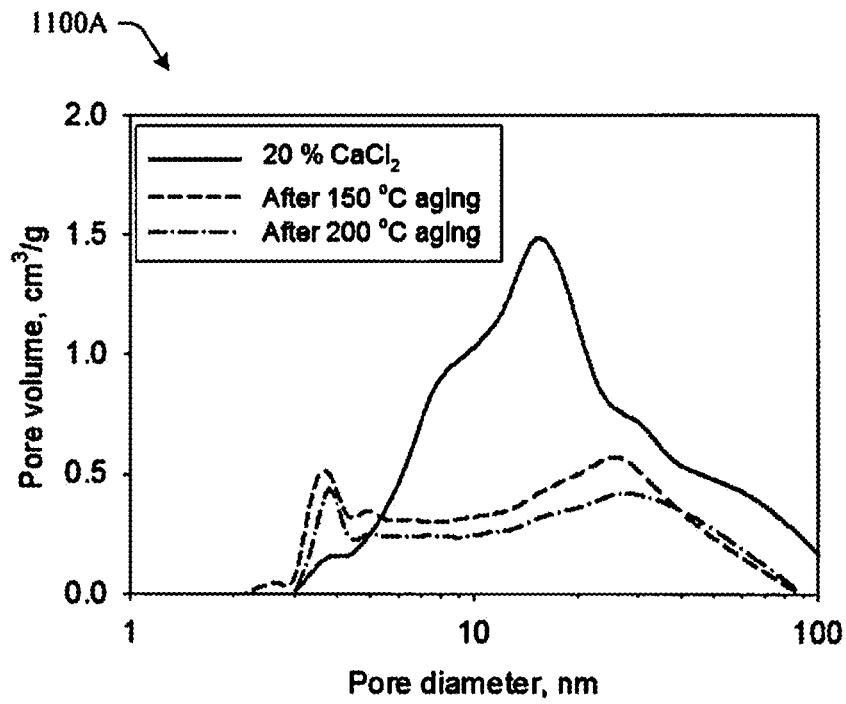
FIGS. 11A and 11B illustrate an effect of aging on pore structure for aerogels made using 20% $CaCl_2$ and 40% $CaCl_2$ respectively in accordance with aspects of the innovation.
Figure 11B:
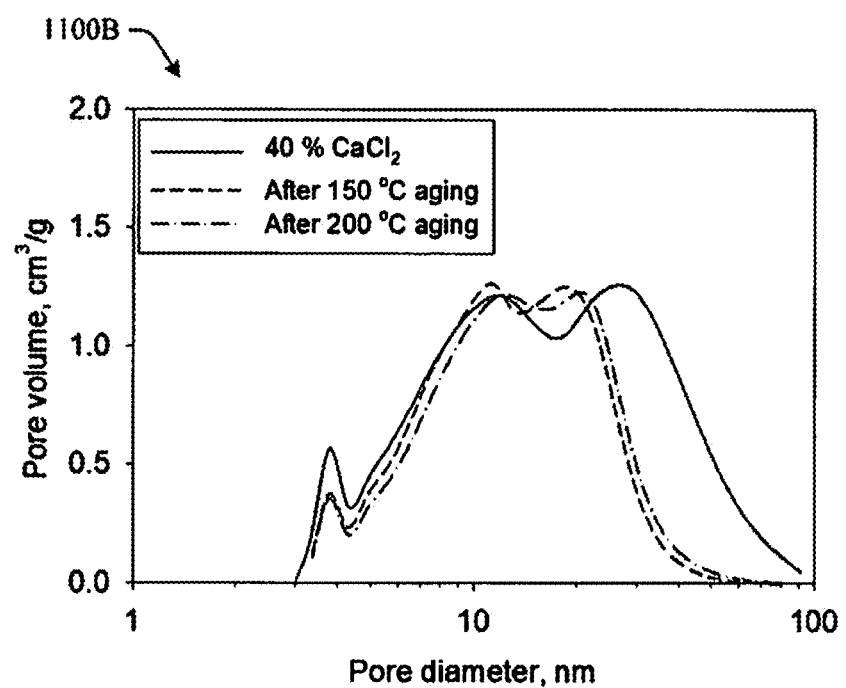
Figure 11C:
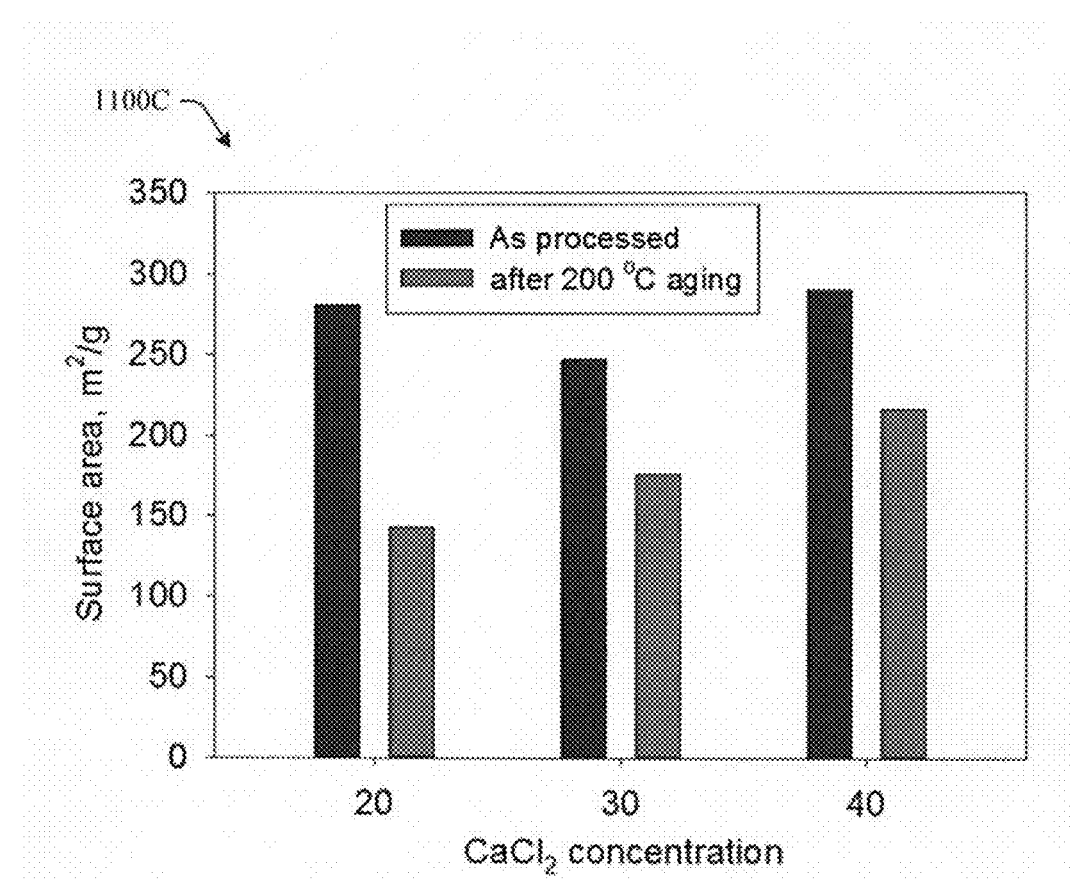
FIG. 11C illustrates a comparison of surface area before and after heating in accordance with aspects of the innovation.

Referring to FIGS. 11A-11C, while shrinkage is reduced, porosity and surface area are affected by heating to approximately 150 or approximately 200° C. As shown in the pore diameter graphs 1100A, 1100B, for aerogels made using 20% $CaCl_2$ (FIG. 11A), the size of the distribution is greatly reduced after heating, indicating that much of the pores smaller than 100 nm are lost. In comparison, aerogels made using 40% $CaCl_2$ (FIG. 11B) do not lose as much of the fine porosity and in fact the pore distribution is somewhat narrower after heating. FIG. 11C shows a comparison 1100C of surface area before and after heating to approximately 200° C. The surface area drops after heating by about half for aerogels made using 20% $CaCl_2$, while those made using 40% $CaCl_2$ lose only 25% of the surface area.

Polyamide aerogels composed of poly-p-phenylene-terephthalamidee, which is the same backbone chemistry as DuPont's Kevlar®, have been fabricated. The all-para substituted polymers gel without the use of cross-linker maintain their shape during processing, which is an improvement over the all meta substituted and meta-para substituted cross-linked polyamide aerogels. Densities range from 0.1 to 0.3 g/cm3, depending on the concentration calcium chloride, the formulated number of repeat units, and the concentration of polymer in the reaction mixture.

Aerogels made using at least 30% $CaCl_2$ had the best strength when compared to aerogels of similar density. Furthermore, aerogels made using 30 wt % $CaCl_2$ exhibited the lowest shrinkage when aged at elevated temperatures although all of the aerogels shrank less than 7% during heating, a great improvement over polyimide aerogels. Due to their low cost and ease of fabrication with respect to other polymer aerogels, the polyamide aerogels have potential for use as insulators in building and construction applications and refrigeration, as well as a host of aerospace applications.

What has been described above includes examples of the innovation. It is, of course, not possible to describe every conceivable composition, article, or methodology for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:
1. A method of creating a polyamide aerogel comprising:
preparing a solution including calcium chloride and a diamine in a first solvent;
cooling the solution to approximately 0° C.;
adding a solid diacid chloride to the solution;
allowing the solution to gel to form a gel;
soaking the gel in a second solvent to remove the first solvent and calcium chloride;
subjecting the gel to supercritical drying to remove the second solvent; and
drying the gel in a vacuum for a predetermined time period to form the polyamide aerogel, wherein the polyamide aerogel comprises a polymer backbone having a number of repeat units.

2. The method of claim 1, wherein prior to allowing the solution to gel, the method further includes stirring the solution for a first time period until the solution becomes cloudy and the viscosity of the solution increases.

3. The method of claim 2 further comprising stirring the solution for a second time period.

4. The method of claim 3 further including pouring the solution into a mold and sealing the mold.

5. The method of claim 1, wherein soaking the gel in a second solvent includes exchanging the second solvent a plurality of times during soaking.

6. The method of claim 1, wherein the first solvent is N-methylpyrrolidinone.

7. The method of claim 1, wherein the second solvent is selected from the group of ethanol and methanol.

8. The method of claim 1, wherein the solid diacid chloride is at least one of terephthaloyl chloride and isophthaloyl dichloride and wherein the solution becomes transparent upon the adding of the solid diacid chloride.

9. The method of claim 1, wherein the diamine is at least one of p-phenylene diamine, m-phenylene diamine, oxydianiline, dimethylbenzidine, and methylene dianiline.

10. The method of claim 1, wherein the solid diacid chloride and the diamine are para-substituted monomers.

11. The method of claim 1, wherein the number of repeat units is at least 20.

12. The method of claim 1, wherein the number of repeat units is at most 60.

* * * * *